(12) United States Patent
Kouvo et al.

(10) Patent No.: US 10,086,707 B2
(45) Date of Patent: Oct. 2, 2018

(54) MINING VEHICLE AND METHOD FOR ITS ENERGY SUPPLY

(71) Applicant: SANDVIK MINING AND CONSTRUCTION OY, Tampere (FI)

(72) Inventors: Mikko Kouvo, Tampere (FI); Samuli Kouhia, Tampere (FI); Samuli Verho, Tampere (FI); Harri Vatanen, Pirkkala (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 293 days.

(21) Appl. No.: 14/976,361

(22) Filed: Dec. 21, 2015

(65) Prior Publication Data

US 2016/0176297 A1 Jun. 23, 2016

(30) Foreign Application Priority Data

Dec. 22, 2014 (EP) ..................................... 14199556

(51) Int. Cl.
*B60L 11/00* (2006.01)
*B60L 11/18* (2006.01)
(Continued)

(52) U.S. Cl.
CPC ............... *B60L 11/005* (2013.01); *B60L 3/06* (2013.01); *B60L 11/1801* (2013.01);
(Continued)

(58) Field of Classification Search
CPC ...... B60L 11/005; B60L 3/06; B60L 11/1816; B60L 11/1801; B60L 11/1809; B60L 11/1861; B60L 11/1803; H02J 3/32
(Continued)

(56) References Cited

U.S. PATENT DOCUMENTS 7,000,395 B2 * 2/2006 Wai ......................... F01K 13/00
290/1 R
7,612,466 B2 * 11/2009 Skutt ................... B60L 11/1842
307/29
(Continued)

FOREIGN PATENT DOCUMENTS

CN 101867211 A 10/2010
CN 102712260 A 10/2012
(Continued)

*Primary Examiner* — Robert Grant
*Assistant Examiner* — John Trischler
(74) *Attorney, Agent, or Firm* — Corinne R. Gorski

(57) ABSTRACT

A mining vehicle and a method for an energy supply of the mining vehicle is disclosed. The mining vehicle includes at least one mining work device, at least one AC electric motor for powering the at least one mining work device, and an auxiliary energy source. The mining vehicle further includes a power electronics device that is used for supplying reactive current and for charging or discharging the auxiliary energy source. The amount of the reactive current supplied by the power electronics device and the amount of the effective charging current for charging or discharging the auxiliary energy source are controlled such that the maximum value for the current of the supply cable and the maximum value for the current of the power electronics device are not exceeded.

8 Claims, 3 Drawing Sheets

(51) Int. Cl.
*B60L 3/06* (2006.01)
*H02J 3/32* (2006.01)

(52) U.S. Cl.
CPC ....... *B60L 11/1803* (2013.01); *B60L 11/1809* (2013.01); *B60L 11/1816* (2013.01); *B60L 11/1861* (2013.01); *H02J 3/32* (2013.01); *B60L 2200/40* (2013.01); *Y02E 60/721* (2013.01); *Y02T 10/7005* (2013.01); *Y02T 10/7072* (2013.01); *Y02T 90/14* (2013.01); *Y02T 90/168* (2013.01); *Y04S 10/126* (2013.01); *Y04S 30/12* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 7,880,430 B2* | 2/2011 | Gale | ............ | H02J 7/02 320/109 |
| 8,247,917 B2* | 8/2012 | Yasugi | ............ | H02P 9/10 290/44 |
| 8,253,376 B2* | 8/2012 | Gale | ............ | H02J 7/02 320/109 |
| 8,660,760 B2* | 2/2014 | Piipponen | ............ | E21B 7/025 701/50 |
| 8,714,286 B2* | 5/2014 | Kouvo | ............ | B60L 11/1801 180/2.1 |
| 8,866,438 B2* | 10/2014 | Lee | ............ | H02J 3/1842 320/104 |
| 8,928,287 B2* | 1/2015 | Abe | ............ | H01M 10/486 320/132 |
| 8,955,657 B2* | 2/2015 | Osara | ............ | H02J 7/345 191/3 |
| 9,481,250 B2* | 11/2016 | Osara | ............ | B60L 9/24 |
| 9,518,427 B2* | 12/2016 | Kouvo | ............ | B60L 1/003 |
| 9,580,966 B2* | 2/2017 | Rudinec | ............ | E21B 7/025 |
| 2005/0198963 A1* | 9/2005 | Wai | ............ | F01K 13/00 60/698 |
| 2009/0189456 A1 | 7/2009 | Skutt | | |
| 2010/0259218 A1 | 10/2010 | Gale et al. | | |
| 2010/0262314 A1* | 10/2010 | Gale | ............ | H02J 7/02 700/295 |
| 2011/0224859 A1* | 9/2011 | Pipponen | ............ | E21B 7/025 701/22 |
| 2012/0049795 A1* | 3/2012 | Dougherty | ............ | B60L 11/1816 320/109 |
| 2012/0061959 A1* | 3/2012 | Yasugi | ............ | H02P 9/10 290/44 |
| 2012/0139488 A1 | 6/2012 | Lee et al. | | |
| 2012/0176091 A1* | 7/2012 | Abe | ............ | H01M 10/486 320/132 |
| 2012/0298004 A1* | 11/2012 | Osara | ............ | B60L 9/12 102/313 |
| 2013/0048382 A1 | 2/2013 | Rudinec | | |
| 2013/0206490 A1* | 8/2013 | Kouvo | ............ | B60L 9/12 180/65.1 |
| 2014/0070754 A1* | 3/2014 | Kouvo | ............ | B60L 9/22 318/771 |
| 2014/0262664 A1* | 9/2014 | Osara | ............ | B60L 9/24 191/12.2 R |
| 2014/0365052 A1* | 12/2014 | Kouhia | ............ | B60L 1/003 701/22 |
| 2015/0090499 A1* | 4/2015 | Kouvo | ............ | B60L 1/003 175/57 |
| 2016/0134001 A1* | 5/2016 | Lindholm | ............ | H01M 10/66 299/29 |
| 2017/0341522 A1* | 11/2017 | Anttonen | ............ | B60L 11/1816 |

FOREIGN PATENT DOCUMENTS

| | | |
|---|---|---|
| EP | 2733007 A1 | 5/2014 |
| EP | 2738035 A1 | 6/2014 |
| JP | 2000004586 A | 1/2000 |
| JP | 2012510014 A | 4/2012 |
| JP | 2013515889 A | 5/2013 |
| JP | 2014239642 A | 12/2014 |
| WO | 2010091743 A2 | 8/2010 |
| WO | 2012037722 A1 | 3/2012 |
| WO | 2012070141 A | 5/2012 |

* cited by examiner

MINING VEHICLE AND METHOD FOR ITS ENERGY SUPPLY

RELATED APPLICATION DATA

This application claims priority under 35 U.S.C. § 119 to EP Patent Application No. 14199556.3, filed on Dec. 22, 2014, which the entirety thereof is incorporated herein by reference.

TECHNICAL FIELD

The present disclosure relates to a mining vehicle and to a method for energy supply of a mining vehicle.

BACKGROUND

In mines, rock drilling rigs and other mining vehicles are used to perform operations according to work cycles of mining work devices at pre-planned work sites. After the necessary tasks according to a work cycle, such as borehole drilling, have been performed, the mining vehicle is moved to the next work site and a new work cycle is started. In underground mines in particular, mining vehicles are generally used, the driving energy for operations according to the work cycles being electricity from an electrical network of the mine. By contrast, transfer drives between work sites are performed by driving energy obtained by using a combustion engine, typically a diesel engine, whereby electric cables or the like do not restrict the transfer drives. However, exhaust gases and noise from a combustion engine cause problems in mines. In addition, a combustion engine occupies a lot of space on the carriage of the vehicle and necessitates regular maintenance. A combustion engine also has adverse effects on fire safety in the mine, since it has hot surfaces and it is also necessary to store and handle flammable fuel in the vehicle and the mine.

Mining vehicles that are continuously connected to the electrical network of the mine are also used in mines. These mining vehicles have an electric motor, and typically one with a constant rotation speed. Power required by the work phase may then be adjusted with hydraulic components, and the electric motor obtains the electric current and load power defined by the energy consumption of the work phase from the electrical network of the mine. Further, the movement of the mining vehicle is then typically bound to the electrical network or at least to a cable connected thereto, the cable being coiled in the mining vehicle or at the fixed electrical network.

SUMMARY

It is an aspect of the present disclosure to provide a new type of mining vehicle and a method for its energy supply.

In the presented solution, a mining vehicle includes at least one mining work device, at least one AC electric motor for powering the at least one mining work device, and an auxiliary energy source. The mining vehicle further includes a power electronics device for charging the auxiliary energy source, and a connecting device connectable to a supply cable for supplying electric current to the mining vehicle from a supply grid. A maximum value for the current of the supply cable is determined.

A current of the supply cable is may be an effective current of the at least one electric motor, a reactive current of the at least one electric motor and an effective charging current of the power electronics device used for charging the auxiliary energy source. The power electronics device is used for supplying reactive current and for charging or discharging the auxiliary energy source. A maximum value for the current of the power electronics device is determined. The current of the power electronics device may include the reactive current supplied by the power electronics device and the effective charging current for charging or discharging the auxiliary energy source. The maximum value for the current of the power electronics device is smaller than the sum of the maximum value of the effective charging current for charging or discharging the auxiliary energy source and the maximum value of the reactive current the power electronics device is able to supply. The amount of the reactive current supplied by the power electronics device and the amount of the effective charging current for charging or discharging the auxiliary energy source are controlled such that the maximum value for the current of the supply cable and the maximum value for the current of the power electronics device are not exceeded. Thereby the supply cable and the power electronics device need not be dimensioned to be large. However, the auxiliary energy source may be charged effectively without limiting full power drilling, for example.

According to an embodiment, the need for charging is determined. If there is no need for charging, as much reactive current as needed and/or possible is supplied by the power electronics device. The reactive current is thus compensated in a simple manner and cost effectively.

If there is a need for charging it is determined whether the needed charging current would cause an overshoot of the maximum value for the current of the power electronics device. If an overshoot is caused, it is determined if it is possible to reduce the reactive current compensation. If it is possible to reduce the reactive current compensation, it is reduced and charging is then performed. Charging is thus performed without causing an overshoot, yet ensuring a sufficient charge in the auxiliary energy source.

According to a further embodiment, a temperature of the electric motor is measured. If the temperature is low enough, it is possible to reduce the reactive current compensation. Thus, in the beginning of the working cycle, for example, the charging may be performed without causing an overshoot and simultaneously supplying a large amount of power from the supply grid to the mining work device, for example.

The mining vehicle may have one or more of the following mining work devices: a rock drilling machine, bolting machine, shotcreting device, scaling device, injection device, blast-hole charger, loader, dumper, measuring device, or drilling, sealing and propellant feeding equipment used in small-charge excavation. The rock drilling machine may be a face drilling device or a device used in production hole drilling, that is a long-hole drilling device that drills boreholes in a fan shape. The mining work device may be an actuator used in handling undetached rock and may perform several consecutive operations according to a given work cycle. Typically, several similar operations are performed with the mining work device at one work site. These operations may be defined in an excavation plan, such as a drilling plan, charging plan, or a corresponding mining plan. The mining work device is usually arranged on a boom with which the device is moved during the work cycle. On the other hand, the mining work device may be arranged on a corresponding support or support structure in a mining vehicle, supporting the device during its work cycle.

The foregoing summary, as well as the following detailed description of the embodiments, will be better understood when read in conjunction with the appended drawings. It

BRIEF DESCRIPTION OF THE FIGURES

In the figures, some embodiments of the present disclosure are shown simplified for the sake of clarity. Similar parts are marked with the same reference numbers in the figures.

DETAILED DESCRIPTION

Figure 1:
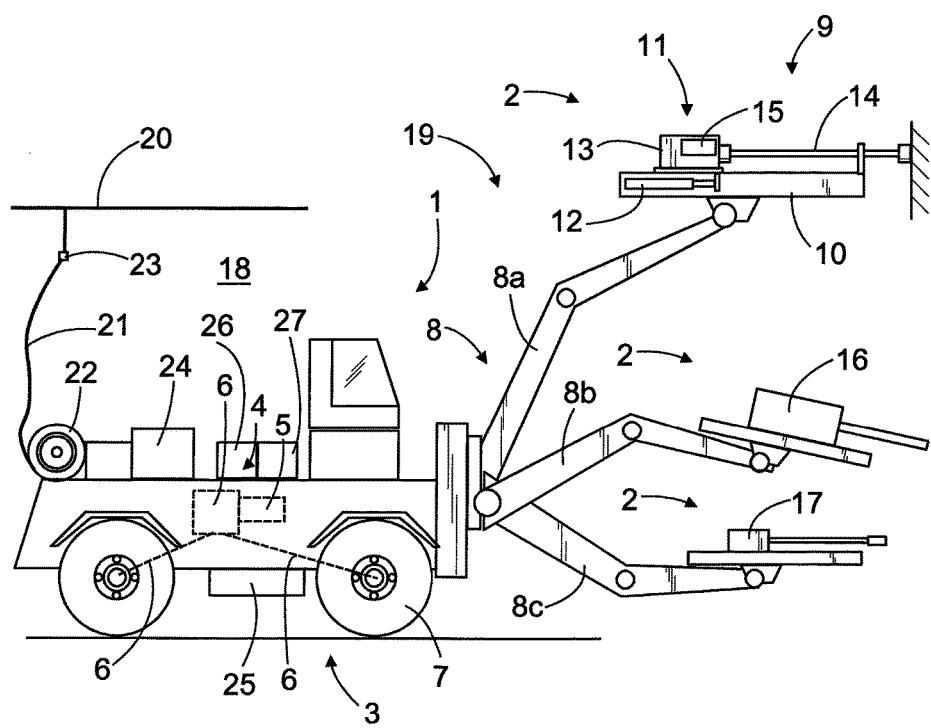
FIG. 1 is a side view of a mining vehicle, in this case a rock drilling rig, according to the present disclosure.

FIG. 1 shows a rock drilling rig, which is one example of a mining vehicle 1 equipped with one or more mining work devices 2. The rock drilling rig includes a carriage 3 that may be moved by drive equipment 4. The drive equipment 4 includes one or more drive motors 5 and one or more power transmission means 6 for transmitting drive power to one or more wheels 7. The drive power transmission may include a mechanical gear system and mechanical power transmission members or, alternatively, the drive power transmission may be hydraulic or electric. There may be one or more booms 8 arranged on the carriage 3, and the boom may be equipped with a mining work device 2.

In the embodiment shown in FIG. 1, the first boom 8a is a drilling boom, at the outermost end of which there is a rock drilling unit 9 comprising a feed beam 10, along which a rock drilling machine 11 can be moved by a feed device 12. The rock drilling machine 11 may include a percussion device 13 for generating impact pulses on a tool and a rotating device 15 for rotating the tool 14 around its longitudinal axis. There may be several of these drilling booms 8a in the rock drilling rig. By way of example, a second boom 8b is shown to include a bolting device 16, with which rock bolts can be arranged in pre-drilled boreholes to support the excavated rock cavern. In the embodiment of FIG. 1, a third boom 8c is equipped with a measuring device 17 for measuring drilled boreholes. Other alternative mining work devices 2 include injection devices used in feeding sealing material into rock, shotcrete processing devices, scaling equipment, devices used in small-charge excavation, and devices for feeding explosives.

The mining vehicle 1 is run in accordance with the excavation plan of the mine 18, or a corresponding pre-drafted plan, to a work site 19 where the mining work device 2 performs operations according to the work cycle, which takes a relatively long time. For instance, the work cycle of a rock drilling machine may include drilling several boreholes defined in the drilling plan at the work site 19. Further, drilling of each borehole typically consists of several work phases, such as collaring, actual drilling, changing extension rods and drill bits, and dismantling extension rod equipment after drilling. Performing a drilling work cycle at the work site 19 may take several hours, sometimes even an entire work shift. Correspondingly, charging, bolting, measuring, and injecting are often quite time-consuming operations. Generally, the use of a mining work device 2 has to do with drilling a borehole or further processing a finished hole. This then means handling undetached rock.

FIG. 1 further shows that the mine 18 has an electrical network or a supply grid 20 that may be fixedly constructed or it may consist of a modifiable network. The supply grid 20 is typically a three-phase alternating current network. When the mining vehicle 1 is at the work site 19, its mining work device 2, hydraulic system and any necessary auxiliary systems are mainly driven by electrical energy obtained from the supply grid 20. The mining vehicle 1 may be connected to the supply grid 20 with one or more supply cables 21. The supply cable 21 may be arranged on a reel 22 and it may be equipped with a suitable connector 23 that may be connected to the supply terminal of the electrical network 20. Alternatively, the reel 22 and the cable 21 may be arranged in the mine 18, and the supply cable 21 is connected to the mining vehicle 1. The mining vehicle 1 includes an electric motor 26, which is connected via a connecting device 24 to the supply grid 20. In the mining vehicle 1, hydraulic pressure is produced by a hydraulic pump 27. The hydraulic pump is rotated by the electric motor.

The mining vehicle 1 is equipped with a connecting device 24, through which the electricity supplied from the supply grid 20 is connected to different devices of the mining vehicle 1. The mining vehicle 1 is also equipped with at least one auxiliary energy source 25. The auxiliary energy source 25 may be a battery, a supercapacitor or their combination, for example, or any other suitable energy source that may be charged.

Figure 2:
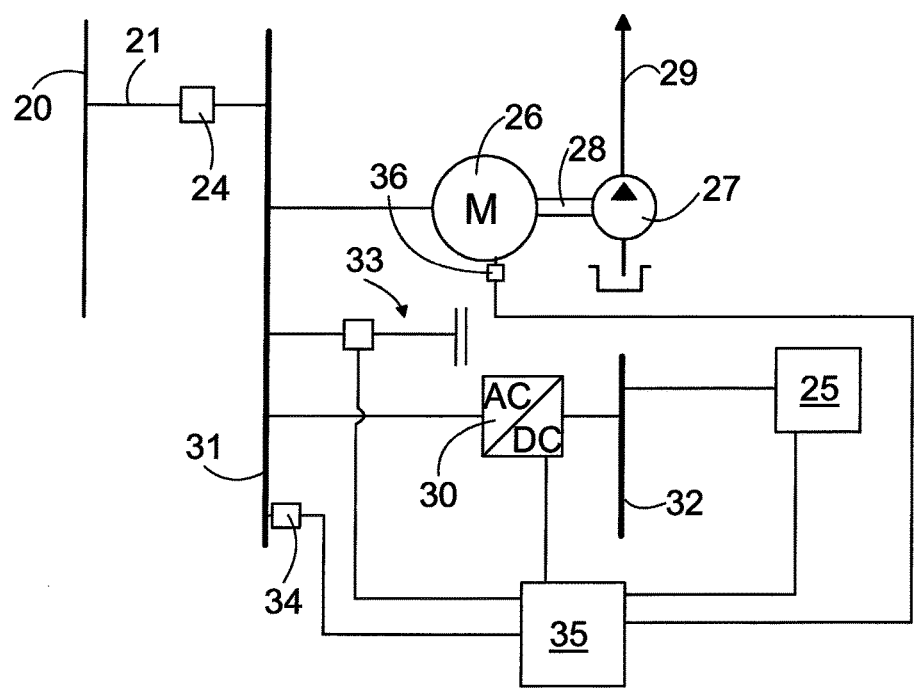
FIG. 2 is a diagram of an energy supply arrangement of a mining vehicle according to the present disclosure.

FIG. 2 shows some parts of the mining vehicle schematically. As shown, the electric motor 26 is connected to the supply grid 20. The electric motor 26 rotates the hydraulic pump 27. The electric motor 26 also includes a shaft 28. When electric energy is supplied from the supply grid 20 to the electric motor 26, the rotor of the electric motor is rotated. The shaft 28 is connected to the rotor of the electric motor 26, and thereby the electric energy from the supply grid 20 rotates the shaft 28.

The shaft 28 is arranged/connected to rotate the hydraulic pump 27. When rotated the hydraulic pump 27 produces hydraulic pressure to the hydraulic system of the mining vehicle. The hydraulic system of the mining vehicle is denoted by reference numeral 29.

The hydraulic pressure in the hydraulic system 29 is used for supplying power to the mining work devices 2, for example. The hydraulic pressure may also be used for driving a hydraulic system of the driving equipment, such as steering and braking, for example.

The energy source 25 is connected via an inverter 30 to the supply grid 20. The inverter 30 is a power electronics device that is used for charging the auxiliary energy source 25. The inverter 30 may also be used for discharging the auxiliary energy source 25. Discharging the auxiliary energy source means that energy from the auxiliary energy source 25 is supplied via the inverter 30 for further use in the mining vehicle or even to the supply grid.

The auxiliary energy source 25 may be connected to the drive motor 5 via the inverter 30. Energy from the auxiliary energy source 25 may thus be used for the transfer drive of the mining vehicle 1, for example.

During full power drilling, for example, it is also possible to supply energy from the auxiliary energy source 25 to the mining work device 2, whereby a boost mode is achieved. In the boost mode, energy is supplied to the mining work device from the supply grid 20 and from the energy source 25. During the boost mode, the load of the electric motor 26 to the supply grid 20 may thus be decreased by simultaneously supplying energy to the mining work device from the energy source 25.

It is also possible to supply energy to the mining work device 2 from the energy source 25 only. Thus, so-called low power drilling could be achieved even if the supply grid 20 were not able to supply energy, for example.

The inverter 30 is connected to a bus bar 31. The electric motor 26 is also connected to the bus bar 31. Other electric motors, such as a water pump and a compressor, may also be connected to the bus bar 31.

A DC bus bar 32 may be provided between the inverter 30 and the auxiliary energy source 25. Other components, such as a cabin heater, may also be connected to the DC bus bar 32.

The mining vehicle may also include a compensation device 33. The compensation device 33 is connected to the bus bar 31. The compensation device 33 may be a fixed compensation capacitor or a controllable compensation device.

The vehicle may also include a power factor meter 34. The power factor meter 34 may also be connected to the bus bar 31. Further, the vehicle includes a control unit 35. Measuring results are guided to the control unit 35 and the control unit 35 controls the devices of the vehicle.

The AC electric motor 26 is a cage induction motor that requires a magnetisation current which is reactive current. If this reactive current is not compensated for at the motor the reactive current oscillates between the motor and the supply grid, thus loading the supply cable 21. The reactive current supplied via the supply cable 21 decreases the supply voltage. Low supply voltage causes overheating of the electric motors, starting problems, and dangerous situations regarding the short-circuit protection. Compensating for the reactive current raises the supply voltage, which in turn decreases the current of the electric motors and minimizes their warming.

The power factor meter 34 measures how much compensation is needed for compensating for the reactive current. The control unit 35 may control the compensation device 33 to supply the reactive current.

Figure 3:
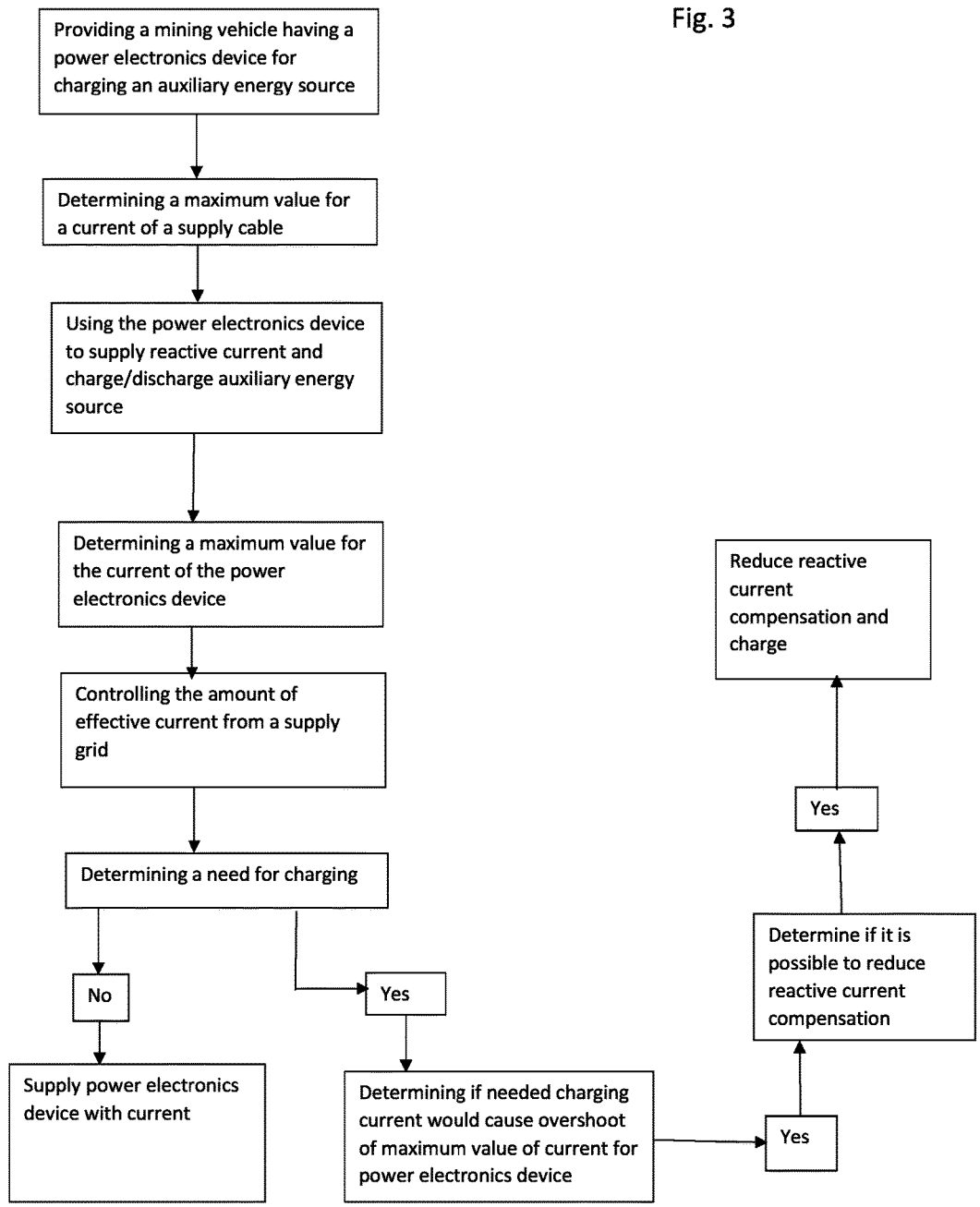
FIG. 3 is a flow chart illustrating the method of the present disclosure.

Referring to FIG. 3, the inverter 30 is such that, in addition to charging or discharging the auxiliary energy source 25, it is capable of supplying a reactive current. If the compensation device 33 cannot supply enough reactive current, the control unit 35 may control the inverter 30 to supply reactive current. Supplying reactive current by the inverter 30 does not substantially consume the energy of the auxiliary energy source 25. The only energy consumed is caused by the losses of the inverter. Therefore it is advantageous to supply by the inverter 30 as much reactive current as possible and/or needed while the inverter 30 is not used for charging or discharging the auxiliary energy source 25, for example, or whenever possible. Naturally, if the need for reactive current is less than the maximum value of the reactive current the inverter is able to supply the inverter supplies only the needed amount. On the other hand, if the need for reactive current is equal to or higher than the maximum value of the reactive current the inverter is able to supply the inverter supplies reactive current as much as possible.

A maximum value for the current of the inverter 30 is, however, determined. The current of the inverter 30 may include the reactive current supplied by the inverter and the effective charging current for charging or discharging the auxiliary energy source 25. Thus, the current of the inverter includes one or more of the following currents: the reactive current supplied by the inverter and the effective charging current charging or discharging the auxiliary energy source. For the inverter 30 not to be dimensioned too high the maximum value for the current of the inverter 30 is smaller than the sum of the maximum value of the effective charging current for charging or discharging the auxiliary energy source and the maximum value of the reactive current the inverter 30 is able to supply. Also a maximum value for the current of the supply cable 21 is determined. A current of the supply cable may include the effective current of the electric motor 26, the reactive current of the electric motor 26 and the effective charging current of the inverter 30 used for charging the auxiliary energy source. Thus, the current of the supply cable may include one or more of the following currents: the effective current of the electric motor, the reactive current of the electric motor and the effective charging current of the inverter used for charging the auxiliary energy source.

The inverter 30 is used for supplying reactive current and for charging or discharging the auxiliary energy source 25 but only such that the maximum value for the current of the supply cable 21 is not exceeded. Thus, during full power drilling, for example, the inverter 30 is not used for charging the auxiliary energy source 25. The inverter 30 is, however, used for supplying as much reactive current as possible and/or needed. Furthermore, the inverter 30 is controlled such that the maximum value for the current of the inverter 30 is not exceeded. Thus, before charging, it is determined if the needed charging current would cause an overshoot of the maximum value for the current of the inverter, and, if it would, no charging would be performed. If, however, it is possible to reduce the reactive current compensation such that the inverter 30 does not supply so much reactive current, the reactive current compensation is reduced. Charging can then be performed without causing an overshoot of the maximum value for the current of the inverter 30. The reactive current compensation may be reduced if no full power drilling is simultaneously performed, for instance. During such a situation the supply grid 20 may supply reactive current via the supply cable 21—provided that the maximum value for the current of the supply cable 21 is not exceeded, naturally.

An excavation plan of the mine may also be used for scheduling the charging. The charging is thus scheduled to be performed between full power drilling sequences, for example.

A temperature of the electric motor 26 may also be measured by a temperature meter 36, for example. In the beginning of the drilling sequence the electric motor 26 is still cold. When the electric motor 26 is cold there is not much need for reactive current compensation. Thus, on the basis of the temperature of the electric motor, the possibility for reducing reactive current compensation may be determined. The inverter 30 may thus be used for charging because there is no need for the inverter 30 to supply reactive current which would cause an overshoot of the maximum value for the current of the inverter 30.

Instead of the inverter 30 the power electronics device may also be a motor drive mechanism or a charging device, for example.

A separate drive motor 5 is not necessarily needed but the electric motor 26 may produce the drive power needed. In that case the power transmission means 6 are connected to the shaft 28 of the electric motor 26. The mining vehicle 1 may include one or more electric motors 26.

The mining vehicle 1 may also include one or more hydraulic pumps 27. The electric motor 26 may rotate one or more hydraulic pumps 27, or each hydraulic motor 27 may include an electric motor of its own.

It should be mentioned that, in this specification, a mine refers to underground mines and opencast mines. Further, the method and the mining vehicle may be used at contract work sites, for example when excavating different rock facilities. Therefore, a contract work site may also be considered a type of mine. At contract work sites, an external electrical network may be modifiable, such as an aggregate on a movable carriage.

In some cases, the features described in this specification may be used as such, regardless of other features. On the other hand, the features described in this specification may also be combined to provide various combinations as necessary.

It will be obvious to a person skilled in the art that, as technology advances, the inventive concept can be implemented in various ways.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method for controlling the energy supply of a mining vehicle comprising the steps of:
   providing a mining vehicle, the mining vehicle including at least one mining work device, at least one AC electric motor for powering the at least one mining work device, an auxiliary energy source, a power electronics device for charging the auxiliary energy source, and a connecting device connectable to a supply cable for supplying electric current to the mining vehicle from a supply grid;
   determining a maximum value for the current of the supply cable, which current of the supply cable may have an effective current of the at least one electric motor, a reactive current of the at least one electric motor and an effective charging current of the power electronics device used for charging the auxiliary energy source;
   using the power electronics device for supplying reactive current and for charging or discharging the auxiliary energy source;
   determining a maximum value for the current of the power electronics device, which current of the power electronics device may include the reactive current supplied by the power electronics device and the effective charging current for charging or discharging the auxiliary energy source, wherein the maximum value for the current of the power electronics device is smaller than the sum of the maximum value of the effective charging current for charging or discharging the auxiliary energy source and the maximum value of the reactive current the power electronics device is able to supply;
   controlling the amount of the effective current from the supply grid, the amount of reactive current supplied by the power electronics device and the amount of the effective charging current for charging or discharging the auxiliary energy source such that the maximum value for the current of the supply cable and the maximum value for the current of the power electronics device are not exceeded; and
   determining a need for charging and, if there is a need for charging, determining whether the needed charging current would cause an overshoot of the maximum value for the current of the power electronics device, and if it does, determining if it is possible to reduce the reactive current compensation, and, if it is possible, reducing the reactive current compensation and thereafter charging.

2. A method as claimed in claim 1, further comprising, if there is no need for charging, supplying by the power electronics device as much reactive current as possible and/or needed.

3. A method as claimed in claim 1, wherein a temperature of the electric motor is measured, and the possibility for reducing the reactive current compensation is decided on the basis of the temperature of the electric motor.

4. A method as claimed in claim 1, further comprising determining an excavation plan of the mine and scheduling the charging on the basis of the excavation plan.

5. A method as claimed in claim 1, wherein the power electronics device is used for discharging the auxiliary energy source, thereby supplying further power to the mining work device.

6. A mining vehicle comprising:
   at least one mining work device;
   at least one AC electric motor for powering the at least one mining work device;
   an auxiliary energy source;
   a power electronics device for charging or discharging the auxiliary energy source and for supplying reactive current, the power electronics device having a maximum value for the current of the power electronics device, which current of the power electronics device may comprise the reactive current supplied by the power electronics device and an effective charging current for charging or discharging the auxiliary energy source;
   a connecting device connectable to a supply cable for supplying electric current to the mining vehicle from a supply grid, the supply cable having a maximum value for the current of the supply cable, which current of the supply cable may include an effective current of the at least one electric motor, a reactive current of the at least one electric motor and the effective charging current of the power electronics device used for charging the auxiliary energy source, wherein the maximum value for the current of the power electronics device is smaller than the sum of the maximum value of the effective charging current for charging or discharging the auxiliary energy source and the maximum value of the reactive current the power electronics device is able to supply; and
   a control unit arranged to control the amount of the effective current from the supply grid, the amount of the reactive current supplied by the power electronics device and the amount of the effective charging current for charging or discharging the auxiliary energy source such that the maximum value for the current of the supply cable and the maximum value for the current of the power electronics are not exceeded, whereby the control unit is arranged to determine a need for charging, and, if there is a need for charging, to determine would the needed charging current cause an overshoot of the maximum value for the current of the power electronics device, and, if it would, to determine if it is possible to reduce the reactive current compensation, and, if it possible, to control the power electronics device to reduce the reactive current compensation and thereafter to charge.

7. A mining vehicle as claimed in claim 6, wherein the control unit is arranged to determine a need for charging, and, if there is no need for charging, to control the power electronics device to supply as much reactive current as possible and/or needed.

8. A mining vehicle as claimed in claim 6, further comprising a temperature meter for measuring a temperature of the electric motor and the control unit is arranged to decide the possibility for reducing the reactive current compensation on the basis of the measured temperature of the electric motor.

* * * * *